United States Patent [19]

Moosbrucker et al.

[11] 4,035,992
[45] July 19, 1977

[54] HAY HARVESTING MACHINE FOR BREAKING UP THE CUT GRASS

[75] Inventors: Karl Moosbrucker, Saulgau; Hans Rauch, Kleintissen, both of Germany

[73] Assignee: Josef Bautz GmbH, Saulgau, Wurthemberg, Germany

[21] Appl. No.: 641,020

[22] Filed: Dec. 15, 1975

[30] Foreign Application Priority Data

Dec. 13, 1974 Germany .............................. 2459007

[51] Int. Cl.² ............................................ A01D 49/00
[52] U.S. Cl. ..................................... 56/1; 56/DIG. 1
[58] Field of Search ............... 56/1, DIG. 1, 364, 14.4

[56] References Cited

U.S. PATENT DOCUMENTS

| | | | |
|---|---|---|---|
| 2,665,537 | 1/1954 | Rust | 56/42 |
| 2,958,992 | 11/1960 | Bornzin | 56/1 |
| 3,472,008 | 10/1969 | Hurlburt | 56/226 |
| 3,676,988 | 7/1972 | Hauser-Lienhard | 56/1 |

FOREIGN PATENT DOCUMENTS 1,582,416  5/1970  Germany .............................. 56/364

*Primary Examiner*—Russell R. Kinsey
*Attorney, Agent, or Firm*—Michael J. Striker

[57] ABSTRACT

A hay harvesting machine comprises a movable support; a drum supported on the support for rotation about a horizontal axis transversal to the direction of motion of the machine; driving means for rotating the drum; conveying members for the cut mass provided on the periphery of said drum; and a plurality of rollers each supported on said chassis for freewheeling about an axis parallel to the axis of rotation of the drum, said rollers being arranged concentrically about the periphery of the drum and being closely spaced peripherally from each other and from the drum, whereby the cut mass is moved by said conveyor means upon rotation of the drum into the space between the rollers and the drum where it is broken up before being discharged to the ground.

10 Claims, 2 Drawing Figures

HAY HARVESTING MACHINE FOR BREAKING UP THE CUT GRASS

BACKGROUND OF THE INVENTION

The invention relates to a hay harvesting machine, and more specifically to a machine which breaks up the cut mass resulting from the action of a mower of any desired kind.

It has already been proposed to obtain a uniform and speedy drying of the cut herbage by means of a machine which has pressure rollers which extend into the path of conveyor prongs up to the periphery of a conveying drum. The pressure rolls are arranged in this device on an axis transversal to the direction of motion of the machine and are spaced from each other and driven to rotate about their axis. The pressure rollers in this case are forced against the periphery of the drum in order to break up the cut mass by bending, buckling or squeezing it. They are adapted to yield against a spring force depending upon the specific thickness of the moving mass.

The effectiveness of the bending, buckling or squeezing of the mass in this prior art machine is insufficient, particularly under those circumstances where the cut mass, because of a relatively high performance, is passed between the pressure rollers and the periphery of the drum in a comparativey thick layer which causes the stalks in the interior of the grass to be broken up only insufficiently or not at all. The drying of the spread herbage in these cases is uneven and for this reason unsatisfactory. There is also the danger of a coiling of the herbs and stalks around the exposed axes or rocker arms of the pressure rollers which can cause a jamming up of the machine and thus interrupt the operation. Besides, it cannot be avoided that delicate leaf portions of the cut mass are ground and torn up between the surfaces of the pressure rolls and the revolving prongs of the drum. This causes substantial losses particularly of portions of the mass which have a high nutrition value.

It is therefore an object of the present invention to provide a machine of simplified function and structure which assures a breaking up of all stalks of the cut mass without grinding of the nutritive leaf portions and accomplishes this even with a high throughput of cut herbage.

SUMMARY OF THE INVENTION

These objects are accomplished by a hay harvesting machine which comprises a movable chassis or support; a drum supported on said chassis for rotation about a horizontal axis transversal to the direction of motion of the machine; driving means for said drum; conveying members for the cut mass provided on the periphery of said drum; and a plurality of rollers each supported on said chassis for freewheeling about an axis parallel to the axis of rotation of the drum, said rollers being arranged concentrically about the periphery of the drum and being closely spaced peripherally from each other and from the drum, whereby the cut mass is moved by said conveyor means upon rotation of the drum into the space between the rollers and the drum where it is broken up before being discharged to the ground.

In a preferred embodiment of the invention the rollers are provided with impact ridges which extend throughout the transverse length of the rollers parallel to their axes. The conveyor drum furthermore has conveyor members formed of an elastic material which likewise extend throughout the transversal length of the drum parallel to its axis and which are subdivided lengthwise into individual sections and have a radial thickness of at least 15 mm.

The cut mass which is lifted by the conveyor members of the drum in this embodiment impinges repeatedly on the impact ridges of the successive rollers and thus imparts a revolving motion on the rollers. Since the rollers are already revolving in the operation of the machine because of the cut mass which has been lifted up in the course of the preceding operation the impact force of the impact ridges provided on the rollers upon the cut mass corresponds only to that force which is necessary to maintain the revolution of the rollers in accordance with the speed of motion of the lifting process. Thus, the stalks of the mass are buckled and bent in a multiplicity of places but are not crushed or torn apart. The impact strength exerted by the ridges of the rollers on the cut mass can be modified by braking the speed of the rollers for instance by a braking belt which may be common to all rollers. Thus, the operation of the machine can easily be adapted to the specific type of cut herbage.

As already pointed out the speed of revolution of the beater ridges on the rollers is always in accord during the operation with the speed of lifting of the mass. Thus, a crushing of the delicate leaf portions does not occur with the machine of the invention and the usual losses by crumbling as occurring in the prior art structures are avoided.

With a larger volume of cut grass a slight delay occurs of the outside zone of the mass on the conveyor drum in its impact against the beater ridges of the rollers. Thus, a continuous movement of all strata of the mass which are further inwards towards the axis of revolution of the drum takes place. Because of the use of several successive rollers all stalks will thus come into contact with the ridges of the rollers no matter whether they are initially more inside or outside of the mass in a peripheral direction. A uniform and speady drying process of the discharged mass is thus assured.

It is also possible to adjust the mass passing between the rollers and the drum by modifying the number of revolutions of the drum so as to keep the mass sufficiently thin to attain a uniform breaking up of all stalks of the mass even with a large volume of herbage and a high speed of motion of the machine.

By employing an elastic material for the conveyor members and arranging the conveyor members on the drum it becomes necessary to provide for a spring suspension of the rollers in order to break up the mass. Thus, since the rollers are not force driven the design and function of the machine is substantially simplified. Besides, the fact that the conveyor members are made of an elastic material assures a highly delicate treatment of the mass and improves also the resistance of the machine against picked-up stones or similar, and furthermore assures a good adaptation of the drum to uneven ground.

According to another improvement of the machine the distance between the periphery of the rollers and the periphery of the drum may be adjusted. This will permit the use of the machine optionally for lifting and turning of the mass with or witout breaking it up.

BRIEF DESCRIPTION OF THE DRAWING

In the attached drawings the general design of the chassis of the machine and the frame are not shown. In the drawing.

Figure 1:
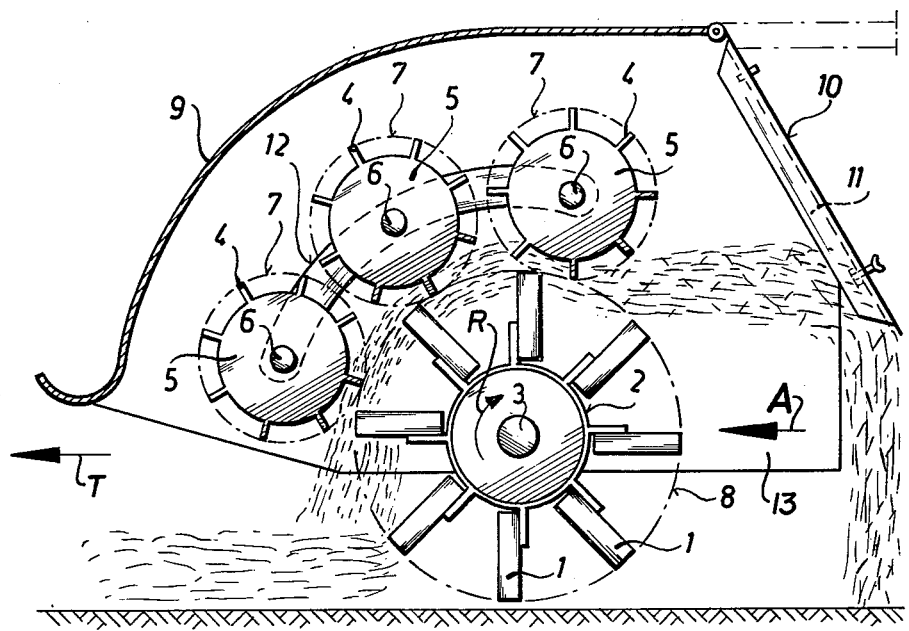
FIG. 1 is a vertical section through the machine according to this invention.

DESCRIPTION OF THE PREFERRED EMBODIMENTS:

With reference now particularly to FIG. 1 it will be seen that the machine has a drum 2 which is provided with conveyor members 1 made of an elastic material and turns about a horizontal axis 3 which is transverse to the direction of motion. The drum 2 is driven by drive means not shown in a direction R of revolution where the conveyor members move near the ground in the direction T of the motion of the machine.

Generally above the drum several rollers 5 are provided which have impact or beater ridges 4. These rollers are adapted for free wheeling about horizontal axes 6 which are transverse to the direction of motion. The rollers are arranged concentrically about the drum with a close spacing of their peripheries 7 to each other and to the periphery 8 of the drum 2.

At a sufficient distance above the rollers 5 a cover sheet 9 is provided to which is attached a discharge sheet 10 in the area behind the drum 2 in the direction of motion. The discharge sheet is provided on the cover sheet about a horizontal axis transverse to the direction of motion and is provided with several guide ledges 11 which are adjustable and extend transversely to the direction of motion.

The moving machine with which the present machine cooperates is arranged forwardly of the machine of the invention. Thus, the mowed grass is picked up by the conveyor members 1 of the drum 2 and is then passed between the rollers 5 and the drum in order to break it up and to assure a uniform and speedy drying. After passing through the space between the rollers and the drum and processing in that space the mass is then thrown to the ground by the discharge sheet 10 which is mowed for this purpose into the downwardly directed position shown in the drawing. The spreading of the mass on the field can be effected with a wide or narrow track by means of the adjustment of the guide ledges 11 on the discharge sheet.

The rollers 5 are supported on a common carrier 12 which is arranged on the lateral walls 13 of the frame for movement in the radial direction of the drum 2. This adjustment device is not shown in the drawing. The adjustment of the distance between the periphery 7 of the rollers 5 and the periphery 8 of the drum 2 permits use of the machine optionally for lifting and turning of the mass with or without breaking up of the stalks.

Figure 2:
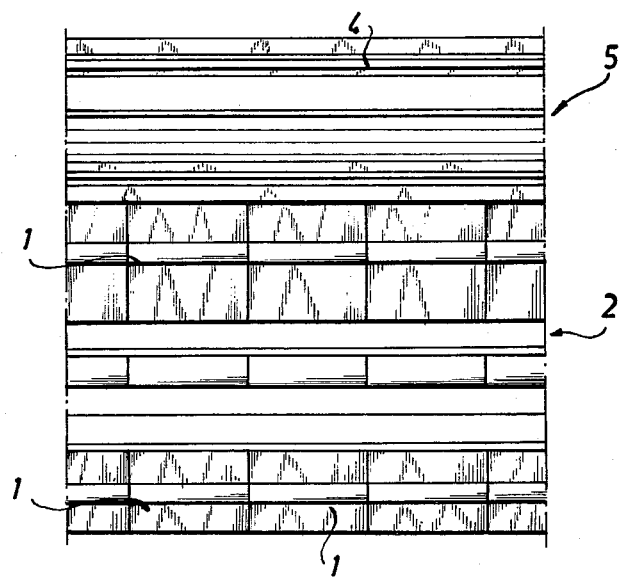
FIG. 2 is a view taken in the direction of arrow A of FIG. 1.

As appears from FIG. 2 the impact ridges 4 of the rollers extend throughout the entire transversal length of the rollers and the conveyor membes of the drum 2 likewise extend lengthwise parallel to the axis of rotation 3 of the drum and conveniently the conveyor members may be subdivided into successive separate sections. This will further improve the resistance of the machine against picked up stones, etc. and will also substantially improve the use of the machine on an uneven terrain.

It will be understood that each of the elements described above, or two or more together, may also find a useful application in other types of hay harvester machines differing from the types described above.

While the invention has been illustrated and described as embodied in a hay harvesting machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A hay harvestng machine comprising:
   a support displaceable along the ground in a predetermined direction;
   a drum rotatable on said support about a horizontal drum axis transverse to said direction;
   a plurality of angularly spaced elastic conveying members on said drum;
   a plurality of rollers freely rotatable on said support about respective roller axes generally parallel to and generally radially equispaced from said drum axis;
   and a plurality of angularly spaced beater blades on said drum is adpated to be driven for rotation about its axis in order to pick up cut crop material from the ground below the drum and throw such material against said rollers to rotationally entrain same.

2. The hay harvesting machine defined in claim 1 wheren said conveying members extend axially the full length of said drum.

3. The hay harvesting machine defined in claim 1 wherein each of said conveying members is formed of an axial succession of separate sections.

4. The hay harvesting machine defined in claim 1 wherein each of said conveying members has a radial dimension of at least 15 mm.

5. The hay harvesting machine defined in claim 1, further comprising a cover carried on said support and extending over said drum and said rollers and guide means on said cover and extending transverse to said direction for deflecting the cut crop after said rollers to the ground.

6. The hay harvesting machine defined in claim 5 wherein said guide means includes a deflecting plate pivoted on said cover about an axis transverse to said direction.

7. The hay harvesting machine defined in claim 1, further comprising a common carrier on said support carrying all of said rollers, 8. The hay harvesting machine defined in claim 7 wherein said carrier is displaceable on said support toward and away from said drum axis.

9. A hay harvestng machine comprising:
   a support displaceable along the ground in a predetermined direction;
   a drum rotatable on said support about a horizontal drum axis transverse to said direction and adapted to be rotated by power means;

conveying members having a radial dimension of at least 15 mm provided on the periphery of said drum; and a pluraity of rollers each freely rotatable on said support and rotatable about respective roller axes parallel to said drum axis and radially equispaced therefrom, said rollers being peripherally closely spaced to one another and to said drum, whereby on rotation of said drum a cut mass is moved by said conveying members into the space between said rollers and said drum where it is broken up before being discharged to the ground.

10. A hay harvesting machine comprising:

a support displaceable along the ground in a predetermined direction;

a drum rotatable on said support about a horizontal drum axis transverse to said direction and adapted to be rotated by power means;

conveying members provided on the periphery of said drum; and a plurality of rollers each freely rotatable on said support and rotatable about respective roller axes parallel to said drum axis and radially equispaced therefrom, said rollers being peripherally closely spaced to one another and to said drum, whereby on rotation of said drum a cut mass is moved by said conveying members into the space between said rollers and said drum wherein it is broken up before being discharged to the ground.

* * * * *